United States Patent [19]
Duttweiler et al.

[11] Patent Number: 5,752,229
[45] Date of Patent: May 12, 1998

[54] INTELLIGENT NEAR-END SPEECH DETECTION

[75] Inventors: Donald Lars Duttweiler, Rumson, N.J.; Toshiro Kawahara, Kanagawa, Japan; Cheng Kim, Lincroft, N.J.; Toshio Miki, Yokohama, Japan

[73] Assignee: Lucent Technologies Inc., Murray Hill, N.J.

[21] Appl. No.: 671,746

[22] Filed: Jun. 28, 1996

[51] Int. Cl.⁶ .................................. G10L 9/18; A04B 3/23
[52] U.S. Cl. ........................... 704/270; 370/291; 379/411
[58] Field of Search .......................... 704/270; 370/291; 379/411

[56] References Cited

U.S. PATENT DOCUMENTS

| | | | |
|---|---|---|---|
| 5,274,705 | 12/1993 | Younce et al. | 379/410 |
| 5,463,618 | 10/1995 | Furukawa et al. | 370/290 |
| 5,668,865 | 9/1997 | Duttweiler et al. | 379/410 |

OTHER PUBLICATIONS

Donald Lars Duttweiler, "A Twelve–Channel Digital Echo Canceler", IEEE Trans. on Communications, vol. COM–26, No. 5, pp. 647–653, May 1978.

Kazuo Murano, Shigeyuki Unagami, and Fumio Amano, "Echo Cancellation and Applications", IEEE Communications Magazine, pp. 49–55, Jan. 1990.

Primary Examiner—David R. Hudspeth
Assistant Examiner—Talivaldis Ivars Šmits
Attorney, Agent, or Firm—Frederick B. Luludis

[57] ABSTRACT

The detection and cancellation of echo in a communications system is enhanced by taking advantage of the accumulated knowledge relating to the echo path delay that an adaptive filter acquires as a result of its adaptation process. Such knowledge improves significantly the ability of an associated Near-End-Speech (NES) detector to detect for the presence of near end speech.

13 Claims, 3 Drawing Sheets

INTELLIGENT NEAR-END SPEECH DETECTION

FIELD OF THE INVENTION

The invention relates to echo cancelers and the like.

BACKGROUND OF THE INVENTION

A conventional echo canceler includes a Near End Speech (NES) detector as well as an adaptive finite impulse response filter, as shown in FIG. 1. The adaptation process of filter 110, FIG. 1, produces a term $\hat{h}(k)$ which is a vector having elements that are samples at time k of the estimated impulse response of the echo path. Signal x(k) represents a speech signal received from the far end of the associated telecommunications connection, i.e., Far-End Speech (FES). The signal y(k) is the sum of Near-End Speech (NES) and returning echo, whereas signal $\hat{y}(k)$ outputted by filter 110 to subtractor 115 is an estimate of the echo component in y(k). The signal, $e_k$, outputted by subtractor 115 is NES plus residual echo and is supplied to the far end. It is also returned to filter 110, where it is used in the adaptation process to improve the estimate, $\hat{h}(k)$, of the echo path impulse response. (It is noted that the operation and theory of conventional filter 110 and NES detector 120 are well-known and, therefore, except for the following, no further explanation thereof is provided herein.)

It is seen from FIG. 1 that the interaction between filter 110 and NES detector 120 is limited to detector 120 inhibiting the adaptation process of filter 110 via lead 121. Detector 120 does so whenever it detects, in accord with prior art teachings, the presence of near-end speech y(k). NES detector 120, more particularly, monitors path 104 in a conventional manner to distinguish echo from NES. If such monitoring and detection indicates that NES is present on path 104, then detector 120 outputs an adaptation control signal (inhibit) which inhibits filter 120 from adapting to the level of the signal on path 104. If, on the other hand, no NES is detected, then the inhibit signal is removed to allow filter 110 to adapt, in a well-known way.

NES detector 120 attempts to distinguish between the echoed far-end speech (FES) and direct NES supplied via unidirectional path 104 by comparing an estimate of the power level of the y(k) signal with an estimate of the power level of the x(k) signal. If the estimated level of y(k) is greater than some fraction (e.g., 0.5 which corresponds to −6.0 dB) of the level of x(k), then NES detector 120 concludes that the y(k) signals contains NES and inhibits the filter 110 adaptation process. However, if the comparison indicates that the power level of the x(k) signal exceeds that of the y(k) signal by the predetermined threshold, then detector 120 concludes that the y(k) signal is pure echo and allows the adaptation process to proceed.

We have recognized that the foregoing process for detecting for the presence of echo is imperfect at best.

SUMMARY OF THE INVENTION

We have also recognized that one reason for this imperfection is that prior NES detectors do not take advantage of the accumulated knowledge relating to the echo path delay that filter 110 has acquired as a result of its adaptation process. We thus improve significantly the performance of NES detector by supplying, in accord with an aspect of the invention, the knowledge that the associated filter has acquired about the echo path delay (i.e., an associated magnitude as captured in the echo path estimate $\hat{h}(k)$) to the NES detector.

These and other aspects of the invention are disclosed in the ensuing detailed description and corresponding drawings.

DETAILED DESCRIPTION

Figure 1:
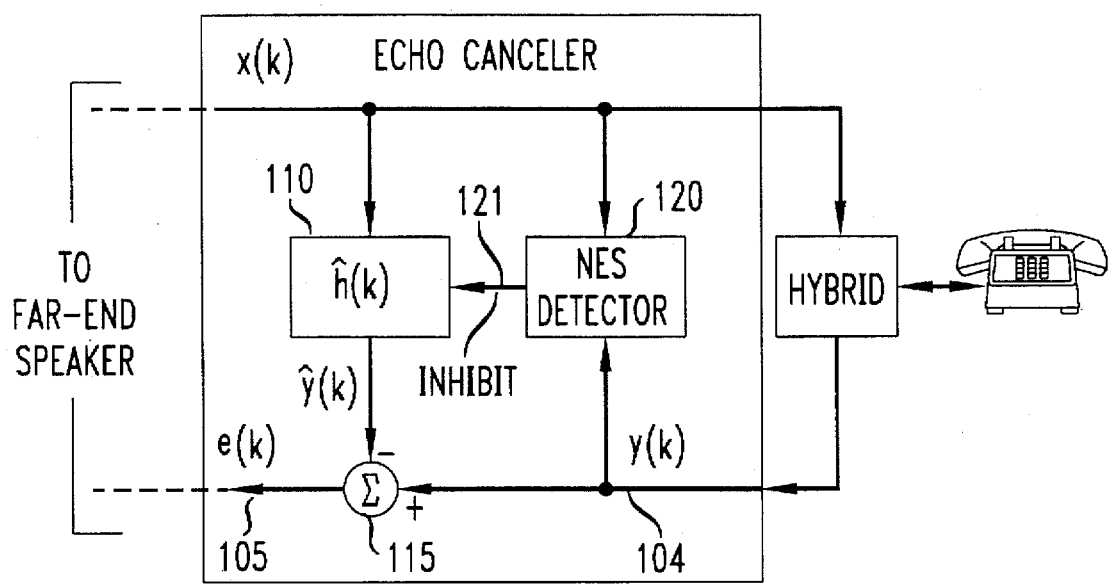
FIG. 1 is a broad block diagram of a transmission network employing an echo canceler arranged in accord with prior art teachings.
Figure 2:
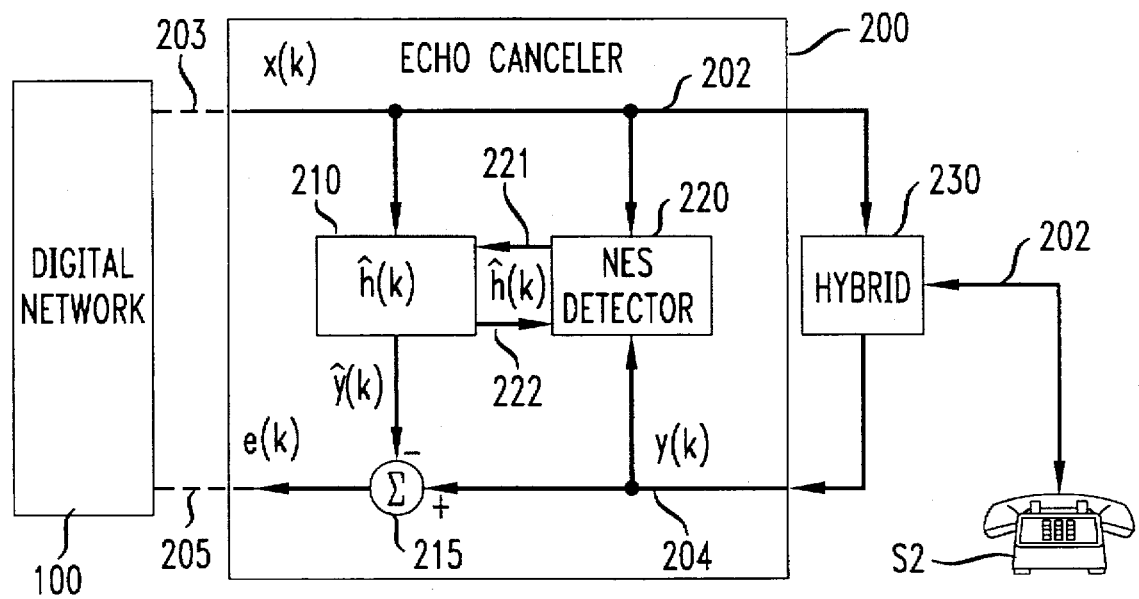
FIG. 2 is a broad block diagram of a transmission network employing an echo canceler arranged in accord with the principles of the invention.

FIG. 2 illustrates in simplified form a telecommunications connection between echo canceler 200 and a far-end digital network 100, in which the connection is composed of unidirectional paths 203 and 205. The dashed lines in connections 203 and 205 are used to indicate that the connections may be of sufficient length to cause an echo signal to be subjectively annoying. Such an echo originates at hybrid 230. It is seen that echo canceler 200 includes, inter alia, an adaptive filter 210 which may be a conventional digital signal processor (DSP) arranged as a finite-impulse-response (FIR) filter. It also includes adder 215 and NES detector 220. NES detector 220, which may also be a conventional DSP, monitors unidirectional path 203 for the presence of far-end speech signals (x(k)) from network 200 and monitors unidirectional path 204 for the presence of near-end speech signals. However, unlike NES detector 120, FIG. 1, NES detector 220 also receives, in accord with an aspect of the invention, the knowledge, e.g., $\hat{h}(k)$, that filter 210 has already acquired about the echo path delay and uses that knowledge in its determination of whether y(k) is near-end speech (NES), as will be discussed below in detail.

Specifically, digital speech samples received from far-end network 100 are converted in a conventional manner (not shown) to analog signals and then supplied to hybrid 230 for delivery to station S2 via path 202. The far-end speech samples are also supplied as they are received via path 203 to NES detector 220 and to an input of adaptive filter 210. Similarly, analog signals received from station S2 via hybrid 230 are converted in a conventional manner (not shown) into digital speech samples y(k) and then supplied to path 204 connected to one input (+) of adder circuit 215. Such samples are also supplied as they are received to another input of NES detector 220. As is done in the prior art, NES detector 220 stores the x(k) samples in sequential order in an internal memory buffer (not shown) composed of a predetermined number N, e.g., 256, of memory locations such that the current sample is stored in place of the oldest sample stored in the buffer. Thus, NES detector 220 stores the latest of 256 speech samples, x(k), in the buffer (hereinafter X-port buffer) in the order that they are received from the far end, e.g., network 100. Hence, the contents of the X-port buffer represents a moving window (i.e., a shift register) that spans a predetermined period of time, e.g., 32 milliseconds, which is equivalent to the duration 256 consecutive x(k) speech samples.

In prior art arrangements, e.g., the arrangement of FIG. 1, each time a new sample, x(k) is stored in the X-port buffer, the DSP controlling the operation of the associated NES detector scans the contents of the buffer to locate the stored sample having the largest absolute magnitude (power level), $x_{max}(k)$. The prior art NES detector then determines if NES is present based on comparing the relative level of the current y(k) sample and the $x_{max}(k)$ signal. It is noted that different techniques for making such a determination are well known to the art. For example, the so-called Geigel algorithm is one such technique and is disclosed in the article entitled "A twelve Channel Digital Echo Canceler by D. L. Duttweiler and published in the May, 1978 IEEE Transactions on Communications, which is incorporated herein by reference. The Geigel algorithm compares the magnitude of the current sample of y(k) that is received via path 204 with a current value of $x_{max}(k)$ as follows:

$$|y(k)| \geq \alpha_y x_{max}(k) \quad (1)$$

where $\alpha_y$ is a predetermined value based on an expected worst-case echo path loss (often 0.5, which corresponds to −6 dB). If the prior art NES detector finds that equation (1) is satisfied, then it sets a particular parameter to true as a way of noting the presence of near-end speech, i.e., declares the presence of NES. NES is also declared if that parameter had been set to true anytime within the recent past (e.g., 32 milliseconds).

In that case, then, the prior art NES detector inhibits the filter adaptation process, as mentioned above.

As also mentioned above, prior art NES detectors do not take advantage of the accumulated knowledge relating to the echo path delay that filter 110 acquires as a result of its adaptation process. We address this failure by arranging filter 210 so that it supplies the current value of ĥ(k) to NES detector 220 and by arranging NES detector 220 so that it adaptively adjusts the value of α as a function of that knowledge to finely tune the detection capability of NES detector 220. An illustrative embodiment of a program which implements this inventive feature (which we call "intelligent threshold NES detection") in the digital signal processor forming NES detector 220 is illustrated in FIG. 3.

Figure 3:
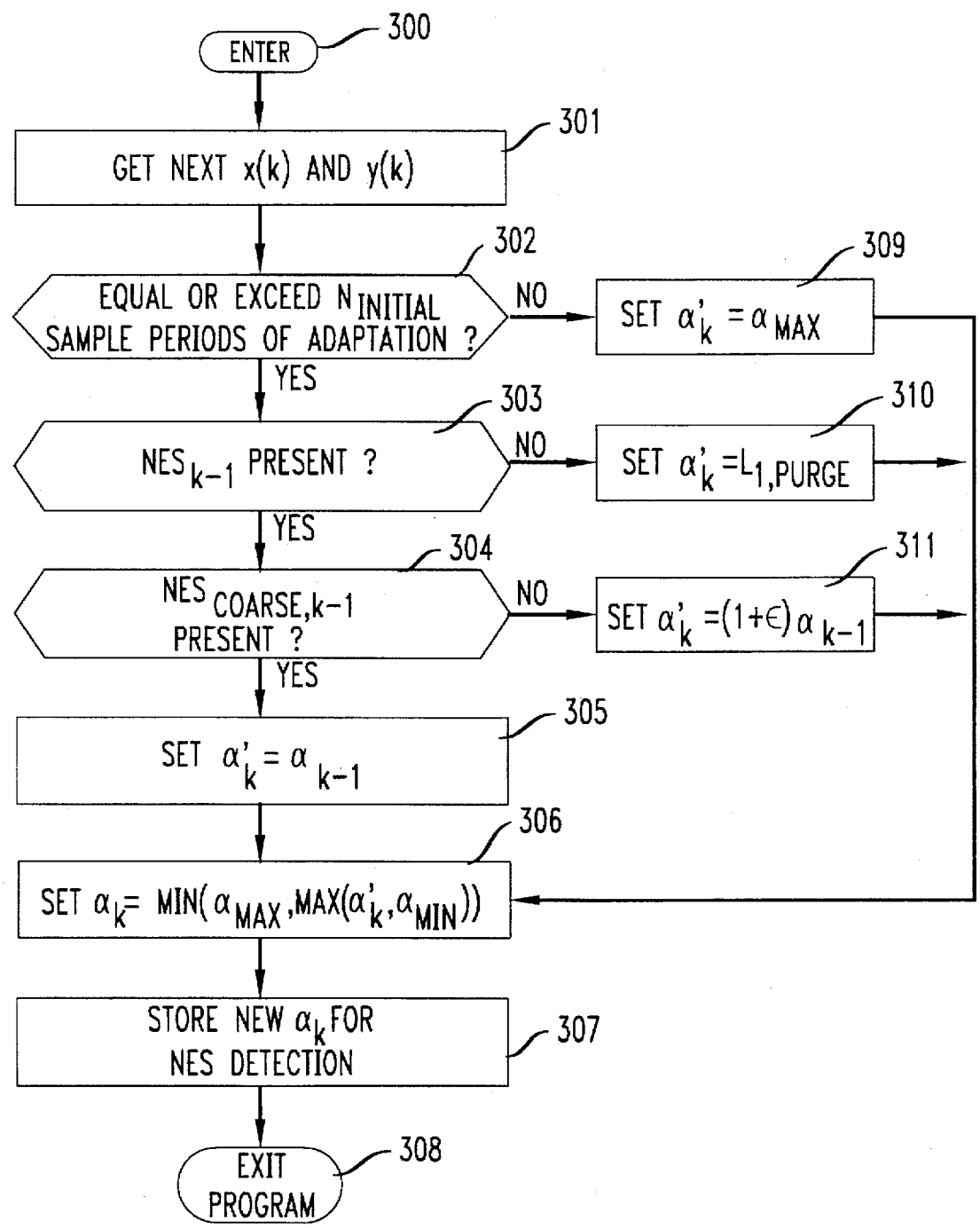
FIGS. 3 and 4 illustrates in flow chart form the programs that implement the principles of the invention in the echo canceler of FIG. 2.

Before discussing FIG. 3 in detail, it would be best to discuss the adaptation of α in general terms. In particular, the sensitivity to NES is enhanced as the value of $\alpha_k$ (now a function of time) is adjusted downward. However, if the value of α becomes too small, then it is likely that echo could be mistakenly identified as speech. We deal with this problem as discussed below. We also recognize that occasionally ĥ(k) might be inaccurate estimate of the true echo path, and, therefore, account for that possibility in the program.

Specifically, the program is entered at block 300 responsive to receipt of the latest far-end speech sample, x(k), and near-end sample, y(k), as represented by block 301. At that point, the program proceeds to block 302 where it checks to see if the initial adaptation process has completed $N_{initial}$ sample periods (where the value of $N_{initial}$ may be, for example, 8000). If that is not the case, then the program proceeds to block 309. Otherwise, it proceeds to block 303. At block 309, the program sets an interim value of $\alpha_k$, i.e., $\alpha_k$, to some maximum value, e.g., a value of 0.5, and then proceeds to block 306. At block 303, the program checks to see if near-end speech (NES) was declared (detected) in the last (previous) sample period, and proceeds to block 304 if that is the case. Otherwise, it proceeds to block 310. At block 304, the program checks to see if a conventional NES detector (also implemented by DSP 220, FIG. 2) had declared that NES is present, in which the declaration is based on a coarse calculation for determining if NES is present. If that is not the case, then the program proceeds to block 311 where it increases the value of α on the basis that α had been adjusted too low. If the value of α becomes too low, then the associated NES detector might possibly declare NES when the coarse detector declared otherwise—meaning that the associated NES detector was possibly mistaken, as mentioned above. It is seen from block 311 that the value of $\alpha_{k-1}$ is multiplied by a predetermined value, 1+ε, e.g., typically 0.001. The value $\alpha_k$ is then set to that result. The program then proceeds to block 305 where it sets the value of $\alpha_k$ to the value of $\alpha_k$ that the program determined during its entry for the last sample period, i.e., $\alpha_{k-1}$. The program then proceeds to block 306 where it finally adjusts the value of $\alpha_k$ so that value does not exceed a predetermined maximum value $\alpha_{max}$, e.g., 0.5, or a predetermined minimum value $\alpha_{min}$, e.g., 0.1. The program then exits via block 308 and is thereafter re-entered at block 300 upon receipt of the next x(K) and y(k).

If NES had not been declared for the last sample period, then the program proceeds to block 311, as mentioned above. At block 311, the program essentially examines the estimated impulse response for the current sample period and purges out (eliminates/cancels) from the vector ĥ those samples whose amplitudes might be in the range of a noise signal, in which such an examination is represented by the value of $L_{1,purge}$. The program thus uses only those samples having sufficient magnitudes in the formation of $L_{1,purge}$, and discards a sample if its magnitude is otherwise. The program then sets $\alpha_k$ to $L_{1,purge}$, which is determined by the following expression:

$$L_{1,purge} = \sum_{n=0}^{N-1} \Psi(\hat{h}_n(k)) \quad (2)$$

where $\hat{h}_n$ is the $n^{th}$ element of the estimated impulse response vector ĥ(k) and Ψ(.) represents a center-clipped rectifier, that is:

$$\Psi(h) = |h|, \text{ if } |h| > \lambda L_\infty \quad (3)$$
$$0, \text{ otherwise}$$

where $L_\infty = \max\{|\hat{h}_0(k)|, |\hat{h}_1(k)|, \ldots |\hat{h}_{N-1}(k)|\}$; λ may be, e.g., 0.1, and n may be, e.g., 256 (for a filter having 256 taps).

It is known that the length (number (N) of filter taps) of an echo canceler filter, e.g., filter 210 (FIG. 2), has to equal or exceed the echo path delay that the filter is attempting to model—meaning that the length of the echo path should be shorter than N. Given that fact, we recognized that before the filter acquires any "knowledge" of the strength of the echo path, the echo path vector h may have significant energy levels across any group (section) of the N filter taps. Because of this, the aforementioned $x_{max}(k)$ value used in conventional NES detector represents a maximum for all samples across the N taps. A second way in which we exploit the knowledge of the echo path contained in ĥ(k) to improve the performance of NES detection is to tune the search for the maximum of the past x(k) samples to a subregion (window) of the filter taps [0, N−1]. We call this intelligent-window NES detection. In accord with another aspect of the invention, we choose a window that covers the smallest number of taps containing an appreciable fraction, β, of the total energy in ĥ. Since this maximum, denoted herein as $x_{win,max}(k)$, is potentially smaller than $x_{max}(k)$, the sensitivity of the NES detector is increased as a result of using $x_{win,max}(k)$ rather than $x_{max}(k)$. This enhancement, "intelligent-window NES detection", may be implemented in a number of different ways.

Figure 4:
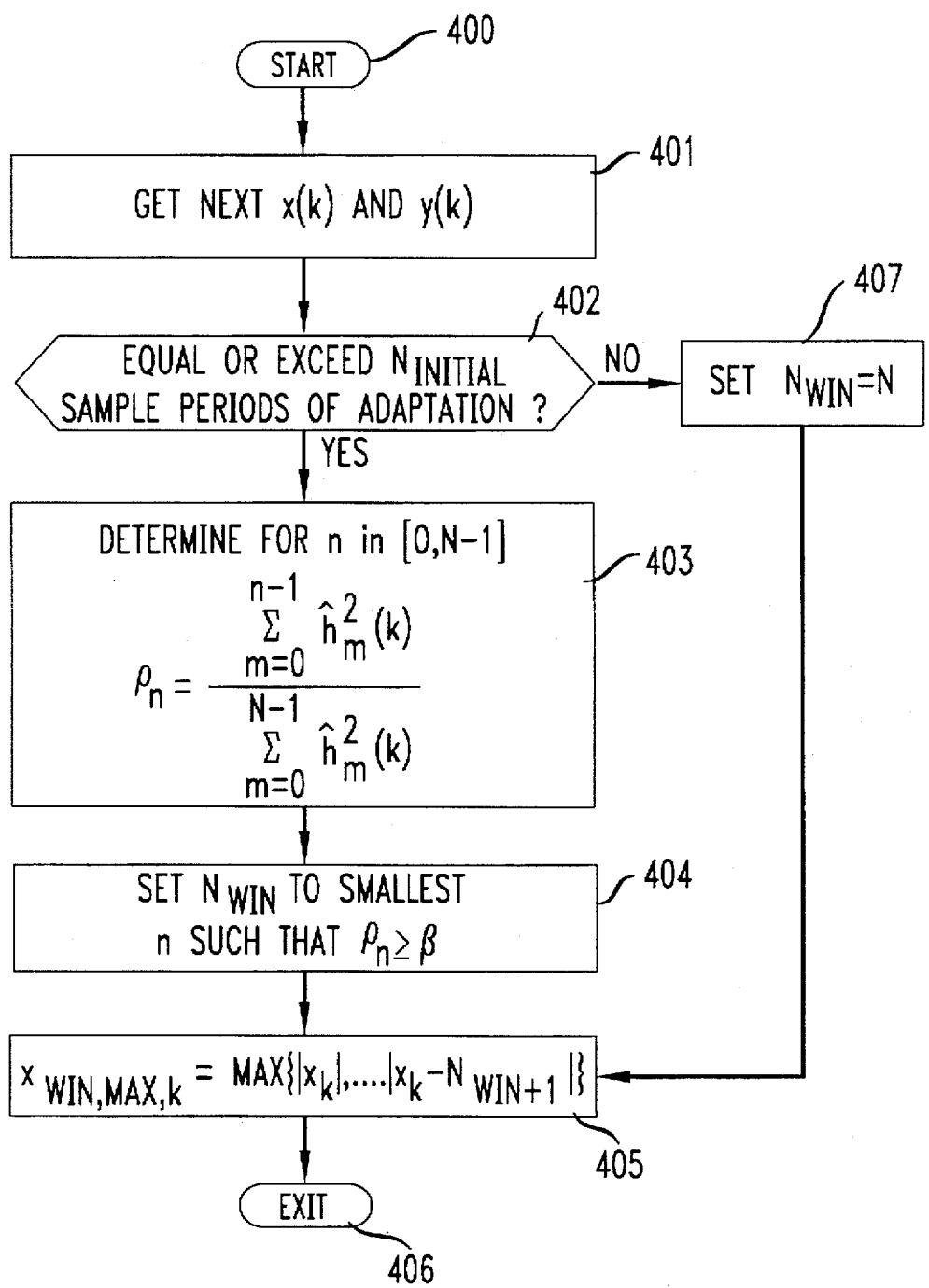

An illustrative embodiment of one such way, which may be implemented in the DSP forming NES detector 220, is illustrated in FIG. 4. The program is entered at block 400 responsive to receipt of the latest far-end speech sample, x(k), and near-end sample, y(k), as represented by block 401. At that point, the program proceeds to block 402 where it checks to see if the initial adaptation process has completed $N_{initial}$ sample periods (where the value of $N_{initial}$ may be, for example, 8000, as discussed above. If that is not the case, then the program proceeds to block 307 where it sets the variable $N_{win}$ to equal the number of taps, N, which may be, e.g., 256 (512). This initially sets the subregion (widow) to the full length of the echo canceler. The program then proceeds to block 405. If the adaptation period is over, then the program proceeds to block 403 rather than to block 407. At block 403, the program determines what percentage ($\rho_n$) of the total energy across all of the taps resides in the first n taps. The total energy is determined by the denominator of the expression in block 403 and the energy in the first n taps is determined by the numerator of that expression. The program computes the expression in block 403 for all values of n [0, N–1]. The program then proceeds to block 404 where it processes the fractions obtained at block 403 to identify the first fraction that is equal to or greater than a predetermined threshold value, β, which may be, e.g., 0.90. When the program identifies that first fraction, it sets a variable $N_{win}$ to the filter tap number (location) associated with the identified fraction to mark, for example, the end of the subregion or window representing 90% of power across all of the taps. The program then proceeds to block 405 to determine, in a conventional manner, $x_{win,max}(k)$ over the determined window. The program then passes that value to the NES detector program and exits via block 406. The program is thereafter re-entered at block 400 responsive to receipt of the next x(k) and y(k).

In an alternative embodiment of the invention, the filter taps (e.g., 256 taps) may be divided into a predetermined number of sections (groups), e.g., 32 sections each having 8 taps. The system, for each newly arrived x(k), determines the total power across all of the taps (Pt). The system then determines the power across the taps of first section of taps (P0) and checks to see if the later value represents 90% of the total power (P0/Pt). If not, it then determines the power across the taps of the second section (P1) and adds that power value to power value determined for the first section (P0+P1). It then checks to see if the latter result represents 90% of the total power. If not, it then determines the power across the taps of the third section (P2) and adds that power value to the power value determined for the first and second sections (P0+P1+P2). The system then checks to see if that result represents 90% of the total power. If not, then the system (program) continues the determination using each succeeding section (e.g., P3, P4, P5, etc.). If so, it then proceeds in the manner described above.

In another alternative embodiment, we recognized that the latter power determination did not have to be done for every new value of x(k). For example, the determination could be done after receiving every fourth value of x(k) without sacrificing significant accuracy.

The foregoing is merely illustrative of the principles of the invention. Those skilled in the art will be able to devise numerous arrangements, which, although not explicitly shown or described herein, nevertheless embody those principles that are within the spirit and scope of the invention.

We claim:

1. An echo canceler comprising an adaptive filter operative for accumulating knowledge of an echo path associated with a connection, in which said knowledge is derived as result of processing signals received from a near-end source of said connection and signals received from a far-end of said connection, and a near-end speech detector, responsive to receipt of said accumulated knowledge from said adaptive filter, for determining, as a function of said accumulated knowledge, if signals received at said near-end of said connection are speech signals or echo.

2. The echo canceler of claim 1 wherein said means for determining includes means, responsive to said near-end signals having a level greater than a value derived as a function of said far-end signals received via said connection from a far-end source of signals and as a function of a particular threshold value, for characterizing said near-end signals as near-end speech signals.

3. The canceler of claim 2 wherein said near-end speech detector includes means, responsive to receipt of samples of said signals from said far-end source, for forming said received said samples of said signals into a current series of samples based on the order in which said samples of said signals are received from said far-end source, means for determining which of succeeding samples of said far-end signals in said series have an accumulated energy that is a predetermined percentage of the total energy represented by all of the samples of the signals forming said series, means for selecting that region of said succeeding samples of said far-end signals having the highest level of energy, and means responsive to said selection for determining an estimate the strength of the far-end signal.

4. The canceler of claim 2 wherein said near-end speech detector includes means, responsive to receipt of samples of said signals from said far-end source, for forming said received said samples of said signals into a current series of samples based on the order in which said samples of said signals are received from said far-end source, means for determining which of succeeding samples of said far-end signals in said series have an accumulated energy that is a predetermined percentage of the total energy represented by all of the samples of the signals forming said series, and means for selecting that region of said succeeding samples of said far-end signals having the highest level of energy as the derived value.

5. The canceler of claim 2 wherein said filter comprises a plurality of filter taps having respective levels of energy characterizing said echo delay path, wherein said accumulated knowledge is characterized by a vector, ĥ, and wherein said means for characterizing said near-end signals, includes means for identifying succeeding ones of said taps having respective levels of energy that when summed represents a predetermined percentage of the energy in ĥ, and for providing the value of said summation as said derived value for comparison with said near-end signals.

6. The canceler of claim 2 wherein said filter comprises a plurality of filter taps having respective current levels of energy characterizing said echo delay path, and wherein said means for characterizing said near-end signals, includes means for dividing said plurality of filter taps into N successive groups of filter taps, where N>1, for determining a current total energy represented by said filter taps, for determining the first M groups of said N groups whose accumulated energy is predetermined percentage of said total energy and supplying value of said accumulated energy as said derived value, where M≧1.

7. The echo canceler of claim 1 wherein said means for determining includes means, responsive to said near-end signals having a level less than a value derived as a function of signals received via said connection from a far-end source of signals and as a function of a particular threshold value, for characterizing said near-end signals as an echo signal.

8. The echo canceler of claim 1 wherein said near-end speech detector further comprises means for adjusting the value of said threshold in accordance with the accumulated knowledge currently received from said filter.

9. The echo canceler of claim 8 wherein said means for adjusting the value of said threshold sets said threshold to a predetermined maxim value if an initial filter adaptation period has not expired.

10. The echo canceler of claim 9 wherein said means for adjusting the value of said threshold includes means, responsive to a sample of said near-end signal received during a previous sample period being characterized as near-end speech and to a coarse determination for detecting the presence of near-end speech indicating that near-end speech is present, for currently setting said threshold to a value derived for said threshold during said previous sample period.

11. The echo canceler of claim 9 wherein said means for adjusting the value of said threshold includes means, responsive to a sample of said near-end signal received during a previous sample period being characterized as near-end speech and to a coarse determination for detecting the presence of near-end speech indicating that near-end speech is present, for currently setting said threshold to a value derived for said threshold during said previous sample period and for then clamping the current value of said threshold so that it is within predetermined minimum and maximum values.

12. The echo canceler of claim 9 wherein said means for adjusting the value of said threshold includes means, responsive to a sample of said near-end signal received during a previous sample period being characterized as near-end speech and to a coarse determination for detecting the presence of near-end speech indicating that near-end speech is not present, for adjusting the value of said threshold upward and for then clamping the resulting value of threshold within predetermined minimum and maximum values.

13. The echo canceler of claim 9 wherein said accumulated knowledge is characterized by a vector, $\hat{h}$, and wherein said means for adjusting the value of said threshold includes means, responsive to a sample of said near-end signal received during a previous sample period being characterized as echo, for excluding from said accumulated knowledge vector components whose amplitudes are in the range of noise signals, for then generating a purge value as a function of the resulting accumulated knowledge vector and for adjusting the value of said threshold as a function of the purge value.

* * * * *